C. NICHOL.
VALVE.
APPLICATION FILED SEPT. 23, 1911.

1,036,513.

Patented Aug. 20, 1912.

Witnesses
Hugh H. Ott.
F. H. Foster.

Inventor
Clinton Nichol
By Victor J. Evans
Attorney

UNITED STATES PATENT OFFICE.

CLINTON NICHOL, OF PRESTON, OKLAHOMA.

VALVE.

1,036,513.

Specification of Letters Patent.

Patented Aug. 20, 1912.

Application filed September 23, 1911. Serial No. 650,924.

*To all whom it may concern:*

Be it known that I, CLINTON NICHOL, a citizen of the United States, residing at Preston, in the county of Okmulgee and State of Oklahoma, have invented new and useful Improvements in Valves, of which the following is a specification.

The invention relates to valves and has for an object to provide a safety valve for use in connection with gas mains and the like for cutting off the flow of the gas with respect to the pressure thereof.

My device is particularly adaptable for use in connection with gas supplies for houses and by employing my device in a gas main, the supply of gas will be shut off to the house when the pressure thereof decreases to a certain limit.

Ofttimes in the use of gas, when the same is employed for lighting purposes, the pressure becomes so low as to extinguish the light and if the pressure is again increased the gas will escape in the room and suffocate the inmates thereof. With the use of my device this danger is dispensed with and the gas to the light will be entirely cut off when the pressure decreases to a certain limit. For the purpose mentioned, use is made of a valve casing provided with an inlet and an outlet, a valve body mounted to repose on a valve seat in the said casing, between the said inlet and said outlet, a cap for the said casing, a stuffing box formed on the said cap, a valve operating rod connected with the said valve body and mounted within a casing and an expansible spring for engagement with the said rod to normally retain the rod in lowermost position.

Reference is to be had to the accompanying drawings constituting a part of this specification, in which similar characters of reference denote corresponding parts in all the views, and in which—

Figure 1:
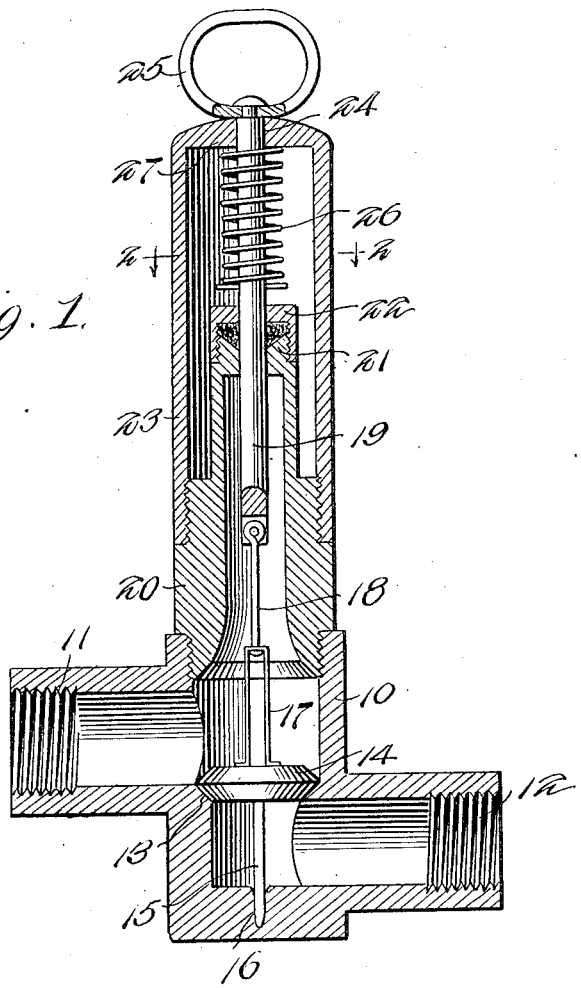
Figure 2:
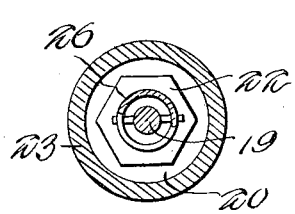
Figure 3:
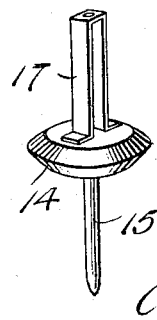

Figure 1 is a vertical sectional view showing the valve body in closed position. Fig. 2 is a horizontal sectional view taken on the line 2—2 in Fig. 1. Fig. 3 is a perspective view of the valve.

Referring more particularly to the views, I provide a valve casing 10 having an inlet 11 and an outlet 12, the inlet being formed at the upper end of the valve casing 10 and the outlet being formed adjacent the lower end of the valve casing 10. Formed in the valve casing 10, between the inlet 11 and the outlet 12, is a beveled valve seat 13 on which is adapted to repose a beveled valve body 14. Extended from the lower end of the valve body 14 is a guide rod 15 adapted to operate in a recess 16 formed in the base of the valve casing 10 and extended upwardly from the upper end of the valve casing 14 is a stirrup 17 having slidable connection with a rod 18, the upper end of the said rod being pivotally connected to a valve operating rod 19. A cap 20 is mounted to threadedly engage the valve casing 10 and act as a cover therefor and the mentioned cap has a stuffing box 21 formed thereon and through which the valve operating rod 19 is extended, the stuffing box 21 being provided with a cap 22 mounted to threadedly engage the stuffing box. Threadedly engaging the cap 20 is a casing 23, the said casing being adapted to inclose the stuffing box 21 and the valve operating rod 19 is adapted to project outwardly through the opening 24 in the upper end of the casing 23, the said valve operating rod having a looped handle 25 secured to the outer end thereof, exteriorly of the casing 23. Mounted to encircle the valve operating rod 19 is an expansible spring 26 having an end thereof abutting against a flange 27 formed on the inner side of the casing 23 with the other end of the spring abutting against a stop pin extended transversely through the valve operating rod 19, the said spring being provided to normally retain the valve operating rod in its lowermost position as shown in Fig. 2. Now if a certain quantity of gas passes into the valve casing 10 through the inlet 11, the valve body 14 having been previously raised from the seat 13 by pulling upwardly on the handle 25, the mentioned gas will pass into the upper part of the valve casing and outwardly through the outlet 12, it being understood that the inlet 11 is connected to the main gas supply while the outlet 12 is connected to a house supply of an auxiliary gas main. Now if the pressure of the gas entering the valve casing through the inlet 11 should decrease, the valve body 14 will move downwardly and engage the valve seat 13, and the gas being of a lower pressure than the weight of the valve body 14, the valve body 14 engaging the valve seat 13 will shut off the supply of gas to the outlet 12. By providing a rod 18 in slidable engagement with the stirrup 17, the valve body 14 will gravitationally move downwardly when the valve operating rod 19 is in its lowermost position and by providing the guide rod 15, slidable in the opening 16, the valve body 14 will be properly guided in the valve casing to accurately repose upon the valve seat 13.

From the foregoing description it will be seen that a valve is provided, which in its automatic operation depends entirely upon the pressure of gas and the gravitational weight of the valve body 14. It will be further seen that with the provision of the device described, all danger of suffocation caused by the cutting off of the gas supply to an open gas jet and then reëstablishing the gas supply, thus causing the gas to flow through the room or house, is prevented and although for the purpose of describing my valve I have shown a particular construction thereof, it will be understood that I do not limit myself thereto and that the scope of the invention is defined in the appended claim.

Having thus fully described the invention, what I claim as new, is:—

In a valve, a valve casing provided with an inlet and an outlet, a valve seat formed in the said valve casing between the said inlet and said outlet, a cap for threaded engagement with the said valve casing, a stuffing box formed in the said cap, a casing threadedly mounted on the said cap, a valve operating rod slidably extending through the said casing and said stuffing box, a rod mounted to pivotally depend from the said valve operating rod, a valve body mounted to repose upon the said valve seat, a stirrup secured to the said valve body and slidably engaging the said rod and a spring mounted to encircle the said valve operating rod and adapted to retain the same in lowermost position.

In testimony whereof I affix my signature in presence of two witnesses.

CLINTON NICHOL.

Witnesses:
GEORGE CATRON,
D. D. PENDERGRAFT.

Copies of this patent may be obtained for five cents each, by addressing the "Commissioner of Patents, Washington, D. C."